(12) United States Patent
Terazawa et al.

(10) Patent No.: US 7,197,839 B2
(45) Date of Patent: Apr. 3, 2007

(54) MICROWAVE DRYING METHOD OF HONEYCOMB FORMED BODIES

(75) Inventors: Tatsuya Terazawa, Kasugai (JP); Naoyuki Shimada, Nagoya (JP); Yasuharu Kuno, Nagoya (JP); Takayuki Sakurai, Kakamigahara (JP)

(73) Assignee: NGK Insulators, Ltd., Nagoya (JP)

( * ) Notice: Subject to any disclaimer, the term of this patent is extended or adjusted under 35 U.S.C. 154(b) by 57 days.

(21) Appl. No.: 11/202,041

(22) Filed: Aug. 12, 2005

(65) Prior Publication Data
US 2006/0042116 A1 Mar. 2, 2006

(30) Foreign Application Priority Data
Aug. 27, 2004 (JP) .............................. 2004-248216
May 20, 2005 (JP) .............................. 2005-148379

(51) Int. Cl.
*F26B 3/34* (2006.01)
(52) U.S. Cl. ..................... 34/259; 219/687; 264/414
(58) Field of Classification Search ................... 34/29, 34/265; 219/687, 759; 264/414, 432
See application file for complete search history.

(56) References Cited

U.S. PATENT DOCUMENTS

| | | | |
|---|---|---|---|
| 4,570,045 A * | 2/1986 | Jeppson ..................... 219/699 |
| 4,837,943 A * | 6/1989 | Mizutani ..................... 34/250 |
| 6,725,567 B2 * | 4/2004 | Yano et al. ................... 34/419 |
| 6,932,932 B2 * | 8/2005 | Miura et al. ................. 264/414 |
| 7,008,461 B2 * | 3/2006 | Kuki et al. ................ 55/282.3 |
| 2003/0090038 A1 * | 5/2003 | Ishikawa et al. ............ 264/432 |

FOREIGN PATENT DOCUMENTS

| | | |
|---|---|---|
| JP | A-2002-283329 | 10/2002 |
| JP | A-2002-283330 | 10/2002 |
| JP | A-2002-283331 | 10/2002 |
| JP | A-2003-106773 | 4/2003 |
| JP | A-2005-138288 | 6/2005 |
| WO | WO 2005/023503 A1 | 3/2005 |
| WO | WO 2005/024326 A1 | 3/2005 |

\* cited by examiner

*Primary Examiner*—S. Gravini
(74) *Attorney, Agent, or Firm*—Oliff & Berridge, PLC

(57) ABSTRACT

A method for drying a honeycomb formed body using microwaves is provided. The method can reduce the difference in the drying speed inside the honeycomb formed bodies during the drying process and can dry the honeycomb formed bodies without cell deformation. The method comprises placing the honeycomb formed body in a drying furnace with the cell axis in the vertical direction and irradiating the honeycomb with microwaves at a frequency of 300–30,000 MHz. The difference of the water content in the vertical direction of the honeycomb formed body 1 is maintained at 0.3% per mm or less during microwave irradiation.

7 Claims, 13 Drawing Sheets

MICROWAVE DRYING METHOD OF HONEYCOMB FORMED BODIES

BACKGROUND OF THE INVENTION

1. Field of the Invention

The present invention relates to a method for drying a honeycomb formed body using a microwave.

2. Description of Background Art

A honeycomb structural body is widely used for a catalyst carrier and various filters, and recently has also attracted attention as a diesel particulate filter (DPF) for capturing particles discharged from a diesel engine.

In many cases, such a honeycomb structural body contains ceramics as major components. This type of honeycomb structural body is commonly manufactured by producing a kneaded compound (a clay) by adding water and various additives to a ceramic raw material, extruding the kneaded compound (the clay) into a formed body in the form of a honeycomb (a honeycomb formed body), and drying and sintering the honeycomb formed body.

A well known method of drying the honeycomb formed body is a dielectric drying method using high frequency energy generated by passing a current between electrodes installed in the upper part and lower part of the honeycomb formed body. A hot air drying method in which a hot wind produced by a gas burner or the like is used is also well known. In recent years, a drying method using microwaves is used in place of or in combination with these drying techniques due to the advantages of a high drying speed and the like (for example, Japanese Patent Application Laid-open No. 2002-283329).

Conventionally, honeycomb formed bodies have been dried by a microwave drying method by providing a drying furnace with a uniform electric field distribution and placing the honeycomb formed bodies in the furnace. As the method for providing a uniform electric field distribution, a method of adjusting the form and location of the antenna which radiates microwaves, a method of using a stirrer fan, and the like have been used.

However, these conventional microwave drying methods could not uniformly dry the entire honeycomb formed bodies because of slow drying speeds at the upper and lower ends and the perimeter of the honeycomb formed bodies. Since a honeycomb formed body shrinks due to vaporization of water, the drying speed difference (difference in the amount of water) inside the formed body causes cells in the honeycomb structural body to deform. The thickness of the ribs (partitions dividing cells) of honeycomb structural bodys have been reduced in recent years. The smaller the thickness of the rib, the easier the cell is deformed. For this reason, the importance of ensuring a uniform drying speed has increased.

The effects of heat dissipation from the honeycomb formed bodies, heat release, transpiring latent heat, and the like during the drying process are considered to cause the difference in the drying speed. In an effort to ensure a uniform drying speed of honeycomb formed bodies by microwave, a method of decreasing heat dissipation by increasing the temperature in the drying furnace to about 80° C., for example, by introducing vapor or hot air into the drying furnace, a method of decreasing the effect of heat dissipation by increasing the microwave output, and the like have been proposed. Although deformation can be suppressed to a certain extent using these methods, a sufficient decrease in the drying speed to provide a satisfactory difference in results is difficult.

The present invention has been completed in view of this situation and has an object of providing a method for drying a honeycomb formed body using microwaves, by which drying of the honeycomb formed bodies without causing cell deformation by sufficiently reducing the difference in the drying speed inside the honeycomb formed bodies during the drying process is possible.

SUMMARY OF THE INVENTION

Specifically, the present invention provides a method for drying a honeycomb formed body using microwaves comprising placing the honeycomb formed body in a drying furnace with the cell axis in the vertical direction and irradiating the honeycomb formed body with microwaves at a frequency of 300–30,000 MHz, while maintaining the difference of the water content in the vertical direction of the honeycomb formed body at 0.3% per mm or less (a first microwave drying method).

The present invention further provides a method for drying a honeycomb formed body using microwaves comprising placing the honeycomb formed body in a drying furnace with the cell axis in the vertical direction and irradiating the honeycomb formed body with microwaves at a frequency of 300–30,000 MHz, wherein the honeycomb formed body is placed inside a cylindrical shelter so that the distance between the outer circumference of the honeycomb formed body and the inner surface of the shelter is in the range from 5 mm to ¼ of the microwave wavelength (a second microwave drying method).

The present invention further provides a method for drying a honeycomb formed body using microwaves comprising placing the honeycomb formed body in a drying furnace with the cell axis in the vertical direction, causing the honeycomb formed body to move in a predetermined direction, and irradiating the honeycomb formed body with microwaves at a frequency of 300–30,000 MHz while moving, wherein a pair of shelter plates is installed on both sides of the moving path of the honeycomb formed body in a manner that the honeycomb formed body is placed between them with the distance between the perimeter of the honeycomb formed body and the shelter being in the range from 5 mm to ¼ of the microwave wavelength (a third microwave drying method).

The present invention further provides a method for drying a honeycomb formed body using microwaves comprising placing the honeycomb formed body in a furnace with the cell axis in the vertical direction, causing the honeycomb formed body to move in a predetermined direction, and irradiating the honeycomb formed body with microwaves at a frequency of 300–30,000 MHz while moving, wherein a forwarding pallet is provided for placing a plurality of honeycomb formed bodies in the direction orthogonal to the forwarding direction, installing said shelter plates on the forwarding pallet with the distance between the honeycomb formed body and the shelter being in the range from 5 mm to ¼ of the microwave wavelength (a fourth microwave drying method).

According to the present invention, the difference in the drying speed inside the honeycomb formed bodies is sufficiently reduced during the drying process so that the honeycomb formed bodies are dried with almost no cell deformation.

DETAILED DESCRIPTION OF THE INVENTION AND PREFERRED EMBODIMENTS

Figure 1:
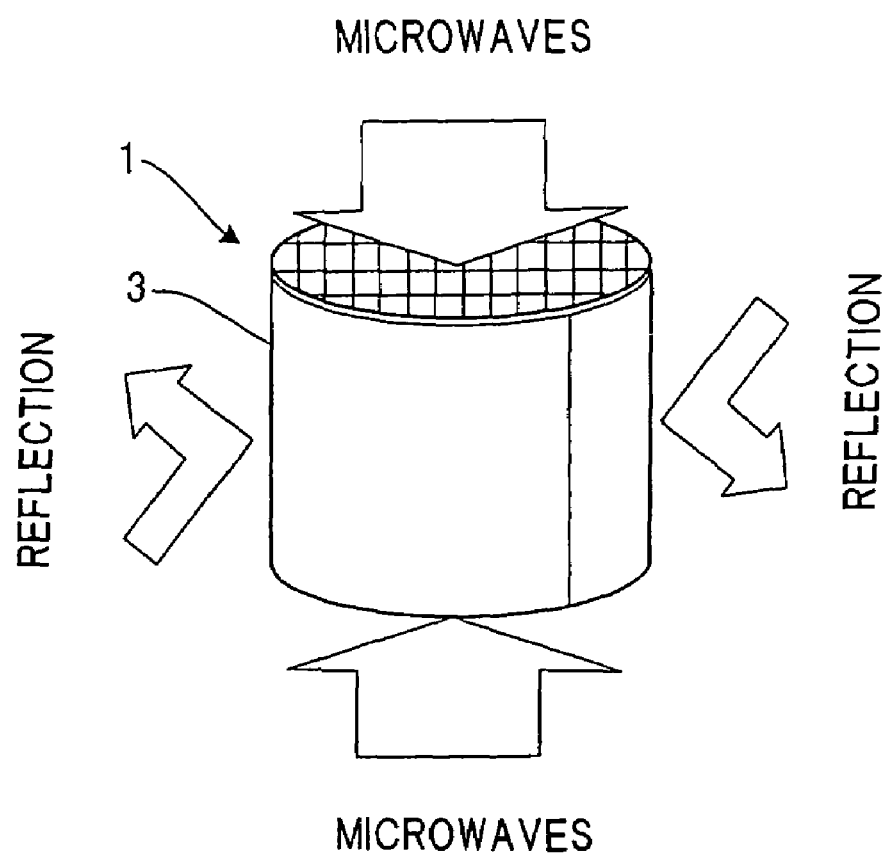
FIG. 1 is a schematic diagram showing an embodiment of the first microwave drying method of the present invention.

The first microwave drying method of the present invention comprises placing the honeycomb formed body in a drying furnace with the cell axis in the vertical direction and irradiating the honeycomb formed body with microwaves at a frequency of 300–30,000 MHz, while maintaining the difference of the water content in the vertical direction of the honeycomb formed body (cell axis direction) at 0.3% per mm or less.

As a result of various experiments, the inventors of the present invention have found that if the honeycomb formed body is irradiated with microwaves while maintaining the water content in the vertical direction of the honeycomb formed body, the difference in the drying speed inside the honeycomb formed bodies can be sufficiently reduced during the drying process and it is possible to dry the honeycomb formed bodies with almost no cell deformation.

This ideal water content distribution in the honeycomb formed body in the vertical direction during the drying process can be achieved by maintaining the microwave incident density (W/cm$^2$) from the vertical direction of the honeycomb formed body to be larger than the incident density (W/cm$^2$) from the horizontal direction and, at the same time, by controlling the microwave output density (kW/kg) to become the threshold value or more of the output density at which the cells of the honeycomb formed body are no longer deformed.

As mentioned above, in conventional microwave drying methods, the drying speed at the upper and lower ends and the perimeter of the honeycomb formed bodies tends to be retarded as compared with the other parts of the honeycomb formed bodies. Specifically, in the vertical direction of the honeycomb formed body, the drying speed is slower in the upper and lower ends than the central part, whereas in the radial direction, the perimeter dries more slowly than the inner part of the honeycomb formed body.

The inventors of the present invention have investigated the reasons for the different drying speeds at different points inside the honeycomb formed body and found that the heat dissipation in the drying process significantly affects the drying speed difference (difference in the amount of residual water content) in the vertical direction of the honeycomb formed body. The types of microwave energy irradiated onto a honeycomb formed body is roughly grouped into the energy consumed by heat dissipation and the energy consumed by the latent heat. Among these, since the energy consumed by heat dissipation is consistent (a fixed value), the rate of the energy consumed by heat dissipation decreases as the microwave output density increases. As a result, the rate of the energy consumed by the latent heat increases and the effect of heat dissipation on the drying speed difference decreases. Deformation of the honeycomb formed body is inhibited in this manner.

Therefore, it is preferable to control the microwave output density (kW/kg) to more than the threshold value at which the cells of the honeycomb formed body are no longer deformed. The heating efficiency of a common microwave drying furnace (energy effectively used for drying/microwave output) is about 0.5. The threshold value of the microwave output density at which the cells of the honeycomb formed body are no longer deformed in this microwave drying furnace is about 3 kW/kg. Therefore, if the microwave output density is controlled to 3 kW/kg or more, preferably 3.6 kW/kg (equivalent to 120% of the threshold value) or more taking the heat variation into consideration, and the incident density is appropriately controlled as described later in this specification, it is possible to maintain the above-mentioned optimum water content difference in the vertical direction of the honeycomb formed body during the drying process.

Figure 3:
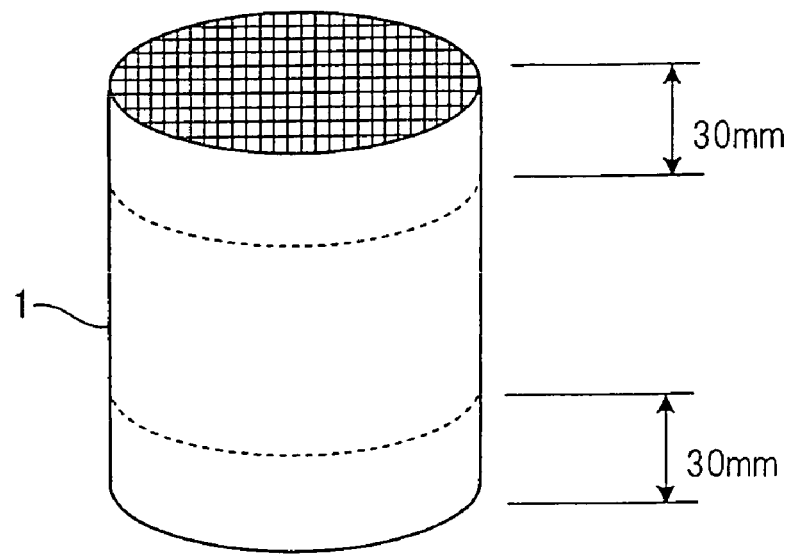
FIG. 3 is a schematic diagram showing the part of the cell for judging whether or not the cells are deformed.
Figure 4:
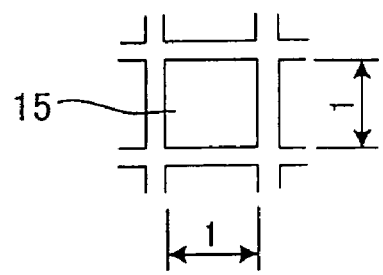
FIG. 4 is a schematic diagram showing a normal cell.
Figure 5:
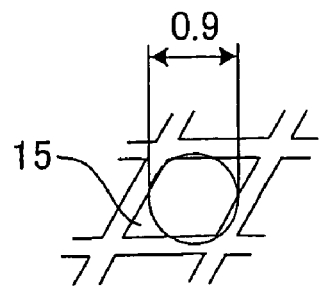
FIG. 5 is a schematic diagram showing a cell judged to be deformed.

In judging whether or not the cells of a honeycomb formed body are deformed, sections at a distance of 30 mm or less from the bottom and the top of the honeycomb formed body 1 (see FIG. 3) are judged. In these sections, one side of a normal cell opening 15 is assumed to be 1 in length (see FIG. 4). The cell is judged to be "not deformed" if a round object with a diameter of 0.9 can be inserted into the cell. If the round object cannot be inserted into the cell, the cell is judged to be "deformed" (see FIG. 5).

Figure 2:
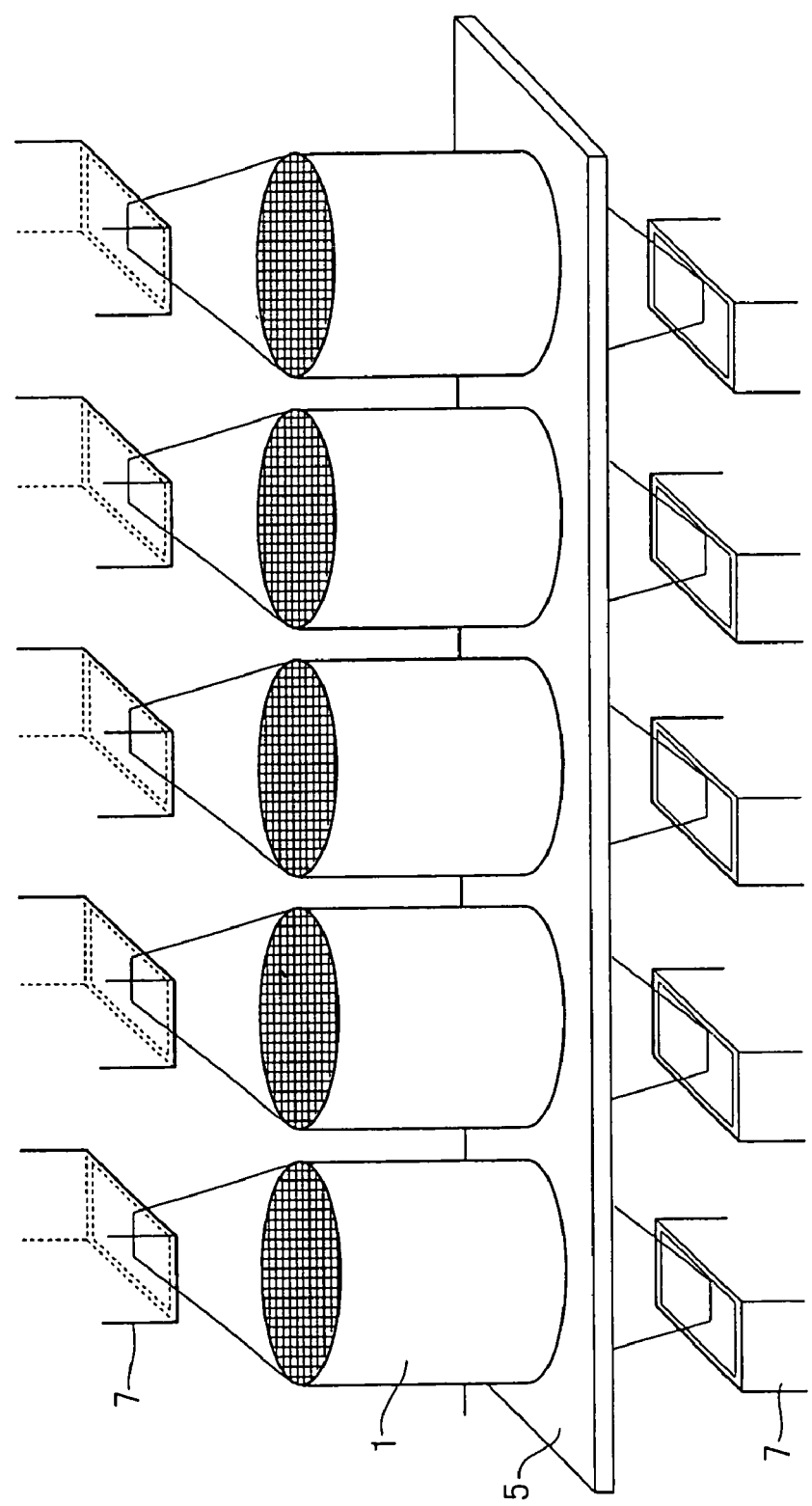
FIG. 2 is a schematic diagram showing another embodiment of the first microwave drying method of the present invention.

In addition, it was found that if the microwave incident density in the vertical direction (end face direction) and the incident density in the horizontal direction (side face direction) of the honeycomb formed body are controlled so that the former is larger than the latter, the drying speed difference in the vertical direction of the honeycomb formed body can be further reduced and the drying speed difference in the radial direction can be suppressed. As a specific method, as shown in FIG. 1, a method of inhibiting the microwave incident from a horizontal direction by, for example, providing a microwave reflector such as an aluminum foil 3 around the side of a honeycomb formed body 1, or by placing a reflector (metal plate) surrounding the side of the honeycomb formed body. Another method comprises installing a wave guide tube 7 on both above and below the honeycomb formed body 1 which is placed on a table 5 in the drying furnace for positively irradiating the honeycomb formed body 1 from both the top and bottom, as shown in FIG. 2.

In the present invention, the microwave incident density A from the vertical direction and the microwave incident density B from the horizontal direction of the honeycomb formed body preferably satisfy the relationship of A/(A+B) >0.7. A high cell deformation control effect can be achieved, if the microwave incident density A from the vertical direction and the microwave incident density B from the horizontal direction of the honeycomb formed body preferably satisfy this relationship.

The second invention comprises a method for drying a honeycomb formed body using microwaves comprising placing the honeycomb formed body in a drying furnace with the cell axis in the vertical direction and irradiating the honeycomb formed body with microwaves at a frequency of 300–30,000 MHz, wherein the formed body is placed inside a cylindrical shelter so that the distance between the outer circumference of the honeycomb formed body and the inner circumference of the shelter be in the range from 5 mm to ¼ of the microwave wavelength.

If the honeycomb formed body is placed in a cylindrical shelter, the outer circumference of the honeycomb formed body is covered by the shelter and the microwave incident density from the horizontal direction of the honeycomb formed body is restricted by the shelter. Consequently, the microwave incident density from the vertical direction of the honeycomb formed body becomes larger than the incident density from the horizontal direction.

As already described in the description of the first microwave drying method, if the microwave incident density in the vertical direction is larger than the incident density in the horizontal direction of the honeycomb formed body, not only can the drying speed difference in the vertical direction of the honeycomb formed body be reduced, but the drying speed difference in the radial direction can also be suppressed. As a result, the drying speed difference inside the honeycomb formed body can be sufficiently reduced, ensuring drying of the honeycomb formed body with almost no cell deformation.

If the outer circumference of the honeycomb formed body is covered by a shelter in the case in which two or more honeycomb formed bodies are placed in juxtaposition and dried simultaneously in a drying furnace, mutual interference between the adjoining honeycomb formed bodies is inhibited, thereby preventing differences in drying conditions between the honeycomb formed bodies. Furthermore, since dry vapor produced from the honeycomb formed body itself can maintain the space around the honeycomb formed bodies at a moderate temperature and humidity, it is possible to dry the products without producing wrinkles and recesses on the external circumference. In Japanese Patent Application Laid-open No. 2002-283329 and the like describing a prior art technology, the inside of the drying furnace is controlled in a high humidity atmosphere of 70% or more in its entirety in order to achieve the same effect. In the present invention, however, the above-described effects can be obtained without maintaining such an atmosphere.

Figure 6:
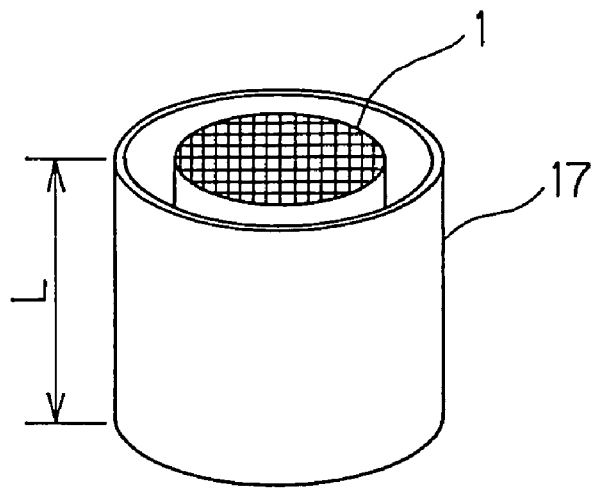
FIG. 6 is a perspective view showing an embodiment of a second microwave drying method.
Figure 7:
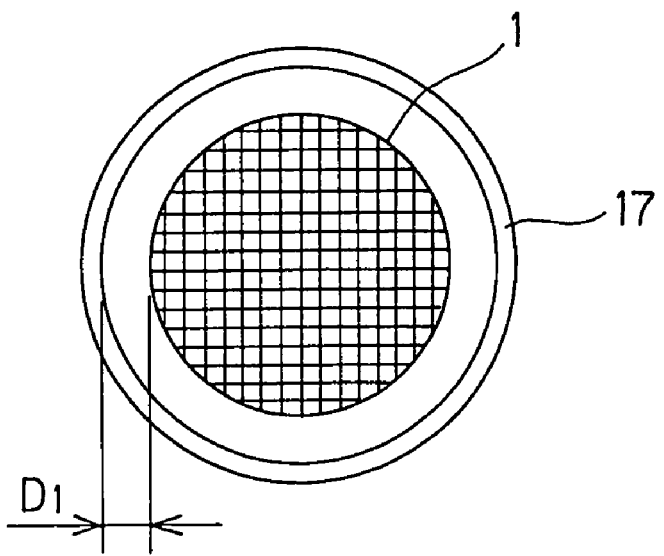
FIG. 7 is a top view showing an embodiment of a second microwave drying method.

FIG. 6 and FIG. 7 are respectively a perspective view and a top view of an embodiment of the second microwave drying method. In this example, a metal cylinder is used as a cylindrical shelter 17, in which the honeycomb formed body 1 is placed. When the internal cross-section of the honeycomb formed body to be dried has a circumferential configuration other than a cylinder, a tubular body having the same internal cross-sectional configuration as the internal cross-section of the honeycomb formed body is preferably used as a shelter. The shelter can be made of a material other than metal insofar as such a material can effectively inhibit invasion of (or reflect) microwaves.

In the second microwave drying method, the distance ($D_1$) between the external circumference of the honeycomb formed body 1 and the inner surface of the shelter 17 is adjusted to 5 mm or more, but ¼ or less of the microwave wavelength. For example, in the case of microwaves at a frequency of 2.45 GHz commonly used in microwave drying of a honeycomb formed body, since these microwaves have a wavelength of 120 mm, the distance ($D_1$) between the external circumference of the honeycomb formed body 1 and the inner surface of the shelter 17 is 5–30 mm. If the distance ($D_1$) is less than 5 mm, water drops produced on the inner surface of the shelter may adhere to the external circumference of the honeycomb formed body, resulting in drying speed fluctuation of the external circumference. If the distance ($D_1$) is more than ¼ of the microwave wavelength, it is difficult to sufficiently prevent the microwave incident density from the horizontal direction of the honeycomb formed body.

The length or height (L) of the shelter 17 is preferably between the length of the honeycomb formed body 1 to be dried plus ½ of the microwave wavelength and the length of the honeycomb formed body 1 minus ½ of the microwave wavelength (specifically, when the center of the shelter 17 in the vertical direction and the center of the honeycomb formed body 1 in the vertical direction are the same, the maximum length of the shelter 17 is such that the top and bottom ends of the shelter 17 is provided with a space equal to ¼ of the microwave wavelength above the top end surface and below the bottom end surface of the honeycomb formed body 1, the minimum length of the shelter 17 is such that the top and bottom ends of the honeycomb formed body 1 is provided with a space equal to ¼ of the microwave wavelength above the top end surface and below the bottom end surface of the shelter 17), and more preferably equivalent to the length of the honeycomb formed body 1. When the length (L) of shelter 17 is shorter than the length of the honeycomb formed body 1, the top end and/or the bottom end of the honeycomb formed body 1 project from the top end and/or bottom end of shelter 17. In such a case, if the length (L) of shelter 17 is not within the range specified above, the projected length is too large to obtain a sufficient shielding effect. When the length (L) of shelter 17 is longer than the length of the honeycomb formed body 1, the top end and/or the bottom end of the shelter 17 project from the top end and/or bottom end of the honeycomb formed body 1. In such a case, if the length (L) of shelter 17 exceeds the range specified above, not only the microwave incident density from the horizontal direction of the honeycomb formed body 1, but also the microwave incident density from the vertical direction may be restricted.

The third microwave drying method of the present invention comprises placing the honeycomb formed body in a furnace with the cell axis in the vertical direction, causing the honeycomb formed body to move in a predetermined direction, and irradiating the honeycomb with microwaves at a frequency of 300–30,000 MHz while moving, wherein a pair of shelter plates are installed on both sides of the moving path of the honeycomb formed body in the manner that the honeycomb formed body is placed between them with the distance between the perimeter of the honeycomb formed body and the shelter being in the range from 5 mm to ¼ of the microwave wavelength.

If the shelter plates are installed on both sides of the moving path of the honeycomb formed body with the honeycomb formed body placed between them, the microwave incident density from the horizontal direction of the honeycomb formed body is restricted by the shelter plates. Consequently, the microwave incident density from the vertical direction of the honeycomb formed body becomes larger than the incident density from the horizontal direction.

As mentioned above, if the microwave incident density in the vertical direction is larger than the incident density in the horizontal direction of the honeycomb formed body, not only can the drying speed difference in the vertical direction of the honeycomb formed body be reduced, but also the drying speed difference in the radial direction can be suppressed. As a result, the drying speed difference inside the honeycomb formed body can be sufficiently reduced, ensuring drying of the honeycomb formed body with almost no cell deformation.

Figure 8:
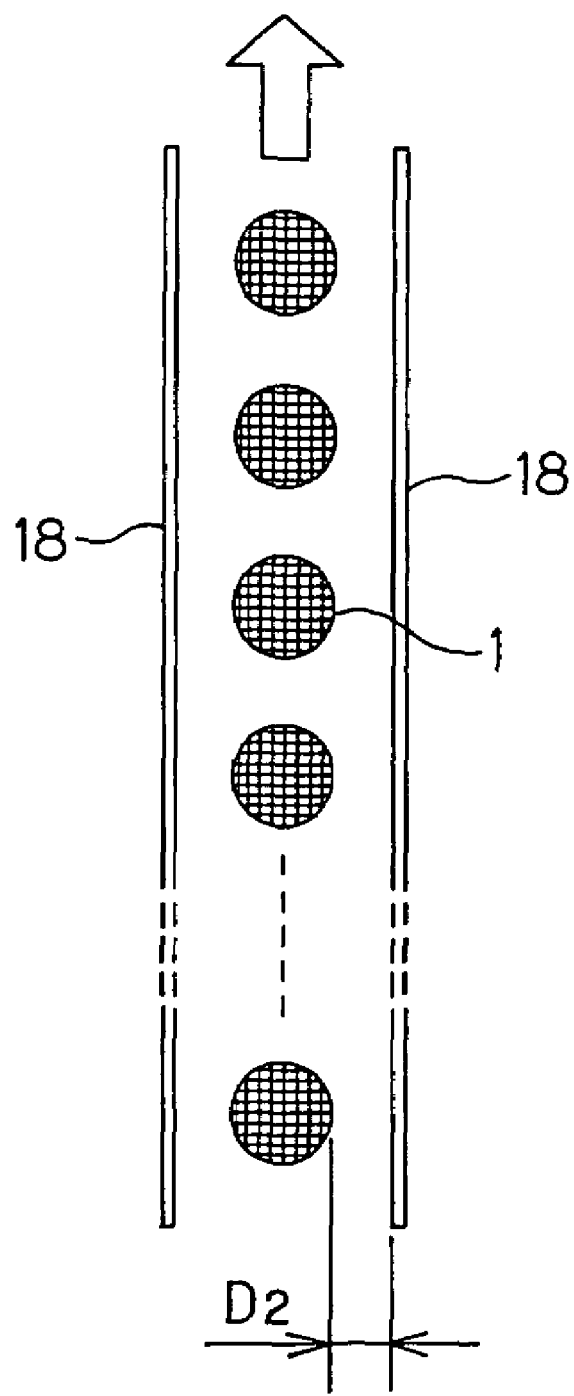
FIG. 8 is a top view showing an embodiment of a third microwave drying method.
Figure 9:
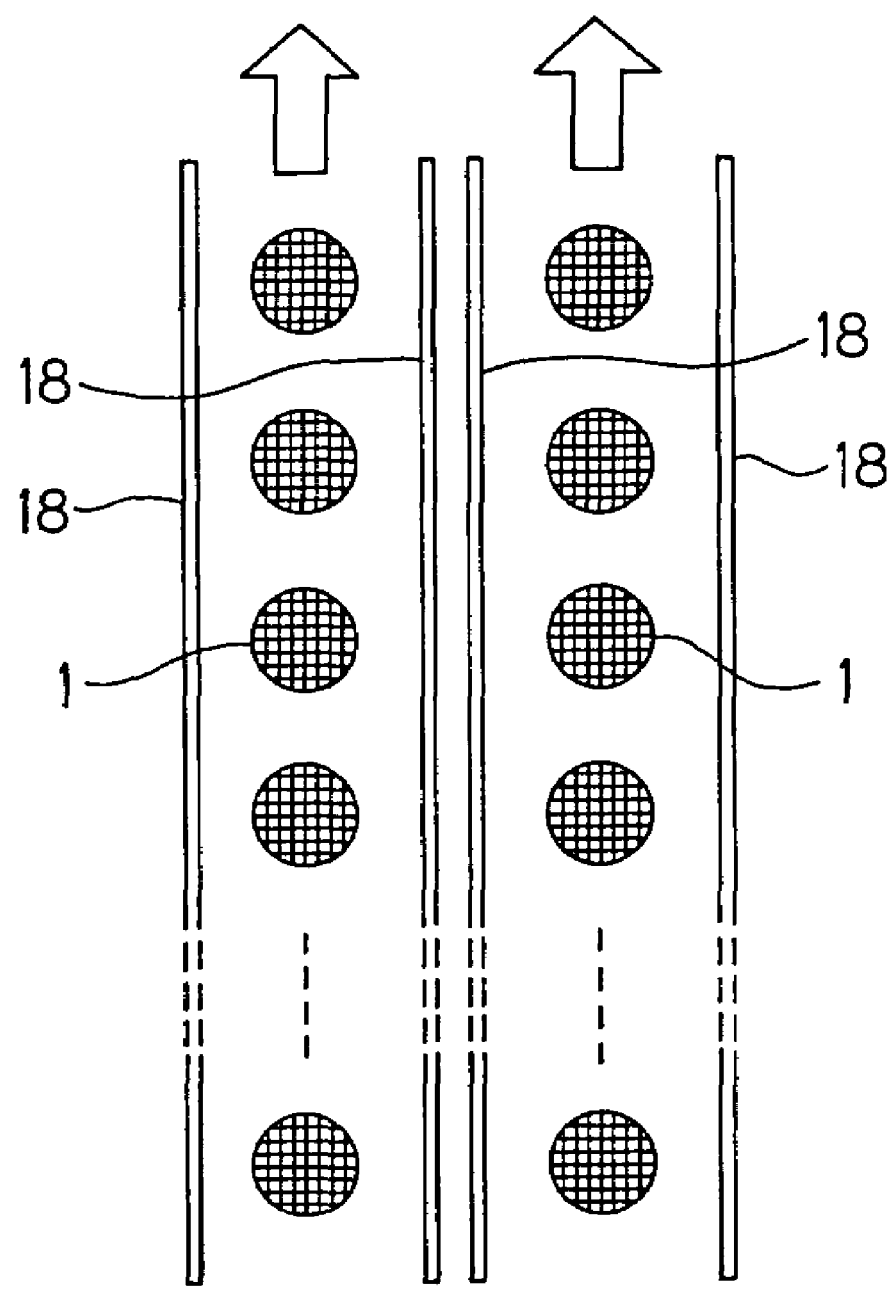
FIG. 9 is a top view showing another embodiment of the third microwave drying method.

FIG. 8 is a top view showing an embodiment of a third microwave drying method. The third microwave drying method is based on the premises that the honeycomb formed bodies are dried in a continuous drying furnace while being conveyed one after another by a carrying mechanism such as a belt or a roller conveyer. Each honeycomb formed body 1 is sequentially conveyed in the direction of the arrow shown in the Figure. Shelter plates 18 are installed on both sides of the moving path of the honeycomb formed body in the manner that the honeycomb formed body is placed between them. A metal plate can be suitably used as the shelter 18. However, materials other than metal can also be used to the extent that the material can effectively inhibit invasion of (reflect) microwaves. In addition, it is possible to install two or more conveyance paths for honeycomb formed body 1 in parallel in the same drying furnace and to install shelter plates 18 on both sides of each conveyance path as shown in FIG. 9.

In the third microwave drying method, the distance ($D_2$) between the honeycomb formed body 1 and the shelter plate 18 is adjusted to 5 mm or more, but ¼ or less of the microwave wavelength. For example, in the case of microwaves at a frequency of 2.45 GHz commonly used in microwave drying of a honeycomb formed body, since these microwaves have a wavelength of 120 mm, the distance ($D_2$) between the external circumference of the honeycomb formed body 1 and the inner surface of the shelter 18 is 5–30 mm. If the distance ($D_2$) is less than 5 mm, water drops produced on the surface of the shelter may adhere to the external circumference of the honeycomb formed body, resulting in drying speed fluctuation of the external circumference. If the distance ($D_2$) is more than ¼ of the microwave wavelength, it is difficult to sufficiently prevent the microwave incident density from the horizontal direction of the honeycomb formed body.

The fourth microwave drying method comprises placing the honeycomb formed body in a furnace with the cell axis in the vertical direction, causing the honeycomb formed body to move in a predetermined direction, and irradiating the honeycomb formed body with microwaves at a frequency of 300–30,000 MHz while moving, wherein a forwarding pallet is provided to place a plurality of honeycomb formed bodies in the direction orthogonal to the forwarding direction, installing said shelter plates on the forwarding pallet with the distance between the honeycomb formed body and the shelter being in the range from 5 mm to ¼ of the microwave wavelength.

If the shelter plates are installed on the forwarding pallet on which two or more honeycomb formed bodies are placed side by side, the microwave incident density from the horizontal direction of the honeycomb formed body is restricted by the shelter plates. Consequently, the microwave incident density from the vertical direction of the honeycomb formed body becomes larger than the incident density from the horizontal direction.

As mentioned above, if the microwave incident density in the vertical direction is larger than the incident density in the horizontal direction of the honeycomb formed body, not only can the drying speed difference in the vertical direction of the honeycomb formed body be reduced, but the drying speed difference in the radial direction can also be suppressed. As a result, the drying speed difference inside the honeycomb formed body can be sufficiently reduced, ensuring drying of the honeycomb formed body with almost no cell deformation.

Figure 10:
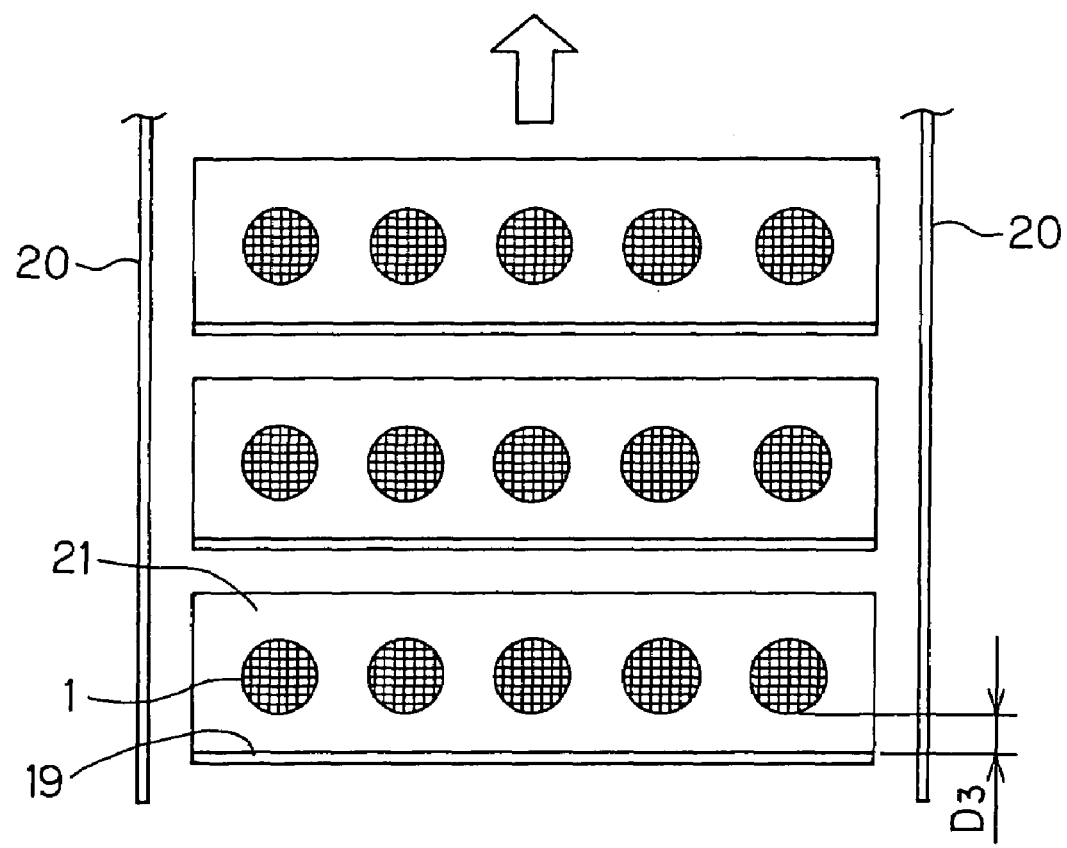
FIG. 10 is a top view showing an embodiment of a fourth microwave drying method.

FIG. 10 is a top view showing an embodiment of the fourth microwave drying method. The fourth microwave drying method is based on the premises that the honeycomb formed bodies are dried in a continuous drying furnace while being conveyed one after another by a carrying mechanism such as a belt or a roller conveyer. Two or more honeycomb formed bodies 1 are arranged on a forwarding pallet 21 in the direction orthogonal to the moving direction (the direction of the arrow in the Figure) to be sequentially forwarded. The forwarding pallet 21 is a plate made from a ceramic porous material and the like, is installed on a forwarding mechanism in the manner that its longitudinal side is orthogonal to the forwarding direction, and moves forward with two or more honeycomb formed bodies 1 being placed thereon. A metal plate can be suitably used as the shelter 19 to be installed on the forwarding pallets 21. However, any material other than metal can also be used to the extent that the material can effectively inhibit invasion of (reflect) microwaves.

In the fourth microwave drying method, the distance ($D_3$) between the honeycomb formed body 1 and the shelter plate 19 is adjusted to 5 mm or more, but ¼ or less of the microwave wavelength. For example, in the case of microwaves at a frequency of 2.45 GHz commonly used in microwave drying of a honeycomb formed body, since these microwaves have a wavelength of 120 mm, the distance ($D_3$) between the external circumference of the honeycomb formed body 1 and the inner surface of the shelter 19 is 5–30 mm. If the distance ($D_3$) is less than 5 mm, water drops produced on the surface of the shelter may adhere to the external circumference of the honeycomb formed body, resulting in drying speed fluctuation of the external circumference. If the distance ($D_3$) is more than ¼ of the microwave wavelength, it is difficult to sufficiently prevent the microwave incident density from the horizontal direction of the honeycomb formed body.

In the fourth microwave drying method, as shown in the example of FIG. 10, in addition to the shelter 19 installed on the forwarding pallet 21, if a pair of plate-like shelters 20 is installed on both sides of the moving path along which the honeycomb formed bodies 1 placed on the forwarding pallet 21 are conveyed in a manner that the honeycomb formed bodies are placed between them, the microwave incident density from the horizontal direction of the honeycomb formed body 1 can be further restricted by the shelter 20 and the drying speed difference inside honeycomb formed body 1 can be further reduced.

In the present invention, the microwave frequency used for irradiating the honeycomb formed body is 300–30,000 MHz, and preferably 900–5,000 MHz. If the microwave frequency is less than 300 MHz, a large volume is required for the furnace due to a large wavelength of about 1 m or more. On the other hand, the microwave frequency of more than 30,000 MHz can only be applied to small honeycomb formed bodies, because such a microwave can penetrate honeycomb formed body only to a limited extent.

The honeycomb formed body to be dried in the present invention is prepared from a kneaded compound, which is prepared by adding water and various additives to ceramics and the like used as raw materials. The kneaded compound is then molded into the shape of a honeycomb. The honeycomb shape herein refers to a configuration of an object having a number of through-holes (cells), each separated by partitions (ribs) and penetrating in the axial direction. Although there are no specific limitations to the material quality, cell density, rib thickness, cell form, and the like of the honeycomb formed body to which the present invention is applied, the present invention is particularly effective for a honeycomb formed body having a thin rib thickness which is easily deformed.

EXAMPLES

The present invention is described below in more detail by examples. However, the present invention is not limited to the following examples.

Reference Example 1

Talc, kaolin, alumina, binder, water, and the like were blended and kneaded. The resulting kneaded compound was extruded from an extruder to obtain a honeycomb formed body with a diameter of 120 mm, length of 200 mm, wall thicknesses of about 100 µm, and comprising about 300 cells per square inch (about 46/cm$^2$). This formed body was vertically placed (so that the cell axis is in the vertical direction) in a batch microwave drying furnace (heating efficiency: 0.5) and dried by irradiating a microwave at a frequency of 2.45 GHz for 300 seconds at an output density of 1 kW. In this example, the ratio of the microwave incident density from the vertical direction to the incident density from the horizontal direction of the honeycomb formed body is supposed to be about 1:1.

Figure 11:
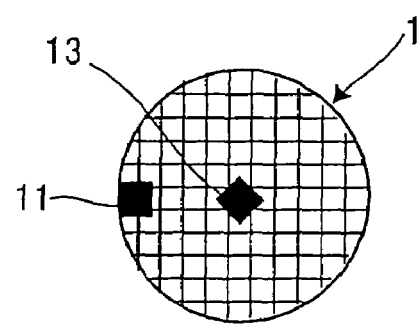
FIG. 11 is a schematic diagram showing the points for measuring the residual moisture in the honeycomb formed bodies in Reference Examples and Examples.
Figure 12:
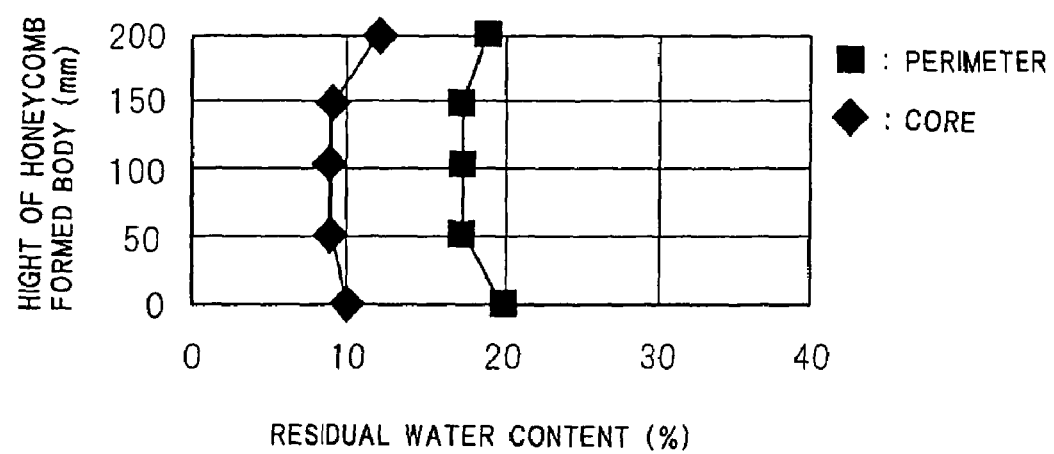
FIG. 12 is a graph showing the results obtained in Reference Example 1.

After drying, the residual water content was measured for the perimeter 11 and the core 13 of the honeycomb formed body 1 shown in FIG. 11, each from a height of 0 (bottom) to 200 (top). The results are shown in FIG. 12. As can be seen from FIG. 12, the honeycomb molded product can be dried more slowly in the perimeter than in the core using a conventional microwave drying method. In the vertical direction, the upper end and lower end (about 30 mm respectively from the top and bottom) are dried more slowly than in the center.

Reference Example 2

Talc, kaolin, alumina, binder, water, and the like were blended and kneaded. The resulting kneaded compound was extruded from an extruder to obtain a honeycomb formed body with a diameter of 120 mm, length of 220 mm, wall thicknesses of about 100 µm, and comprising about 300 cells per square inch (about 46/cm$^2$). This formed body was vertically placed (so that the cell axis is in the vertical direction) in a batch microwave drying furnace (heating efficiency: 0.5) and dried by irradiating microwaves at a frequency of 2.45 GHz for 600 seconds at an output density of 0.5 kW/kg. In this example, the ratio of the microwave incident density from the vertical direction to the incident density from the horizontal direction of the honeycomb formed body is supposed to be about 1:1. After drying, the residual water content was measured for the perimeter 11 and the core 13 of the honeycomb formed body 1 shown in FIG. 11, each from a height of 160 (bottom) to 220 (top).

Reference Example 3

A formed body prepared in the same manner as in Reference Example 2 was vertically placed (so that the cell axis is in the vertical direction) in a batch microwave drying furnace (heating efficiency: 0.5) and dried by irradiating microwaves at a frequency of 2.45 GHz for 60 seconds at an output density of 5 kW/kg. In this example, the ratio of the microwave incident density from the vertical direction to the incident density from the horizontal direction of the honeycomb formed body is supposed to be about 1:1. After drying, the residual water content was measured in the same manner as in Reference Example 2. The results are shown in FIG. 14.

Figure 13:
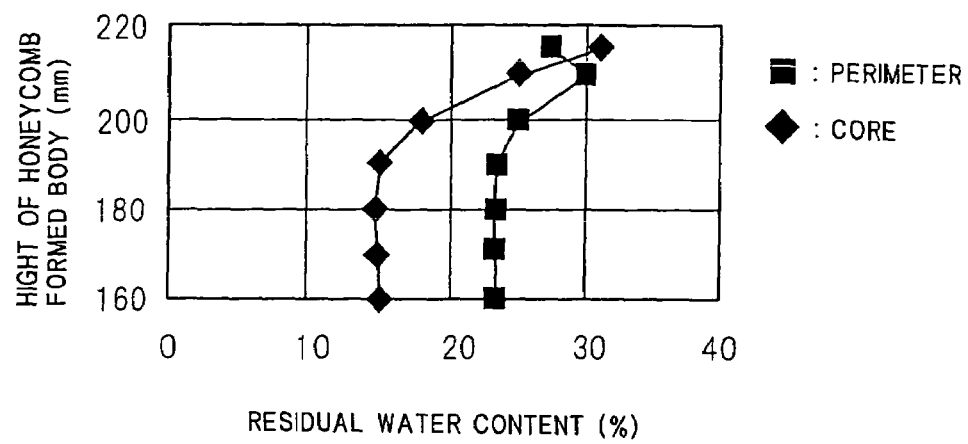
FIG. 13 is a graph showing the results obtained in Reference Example 2.
Figure 14:
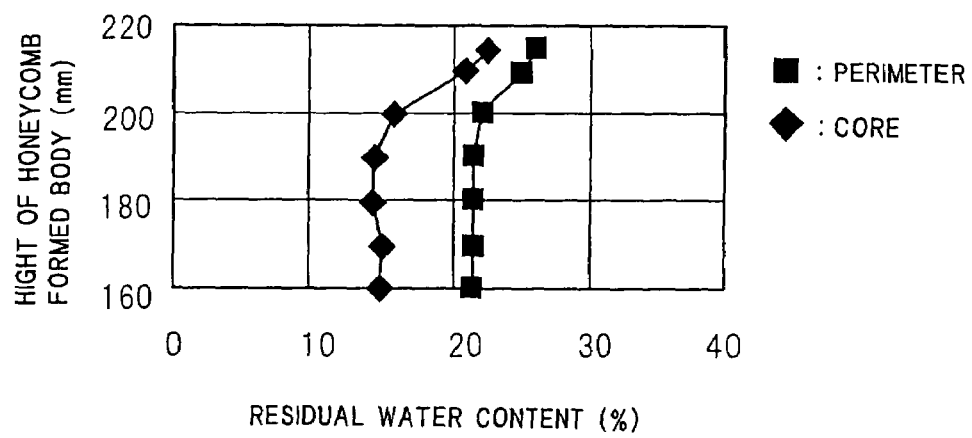
FIG. 14 is a graph showing the results obtained in Reference Example 3.
Figure 15:
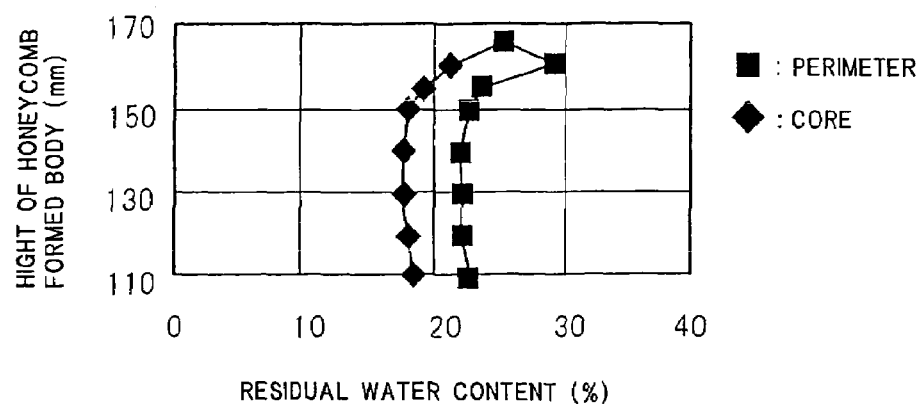
FIG. 15 is a graph showing the results obtained in Reference Example 4.

It can be seen from FIG. 13 and FIG. 14 that the difference in the residual water content in the vertical direction, i.e., the difference in the drying speed in the vertical direction, is smaller in Reference Example 3 with a larger microwave output density of 5 kW/kg than in Reference Example 2 with a smaller power microwave output density of 0.5 kW/kg. The reason is supposed to be that the larger the microwave output density, the larger the proportion of the energy consumed by the latent heat to the energy consumed by heat dissipation, whereby the effect of the drying rate difference on heat dissipation decreased. However, the deformation of cells could not be sufficiently controlled even in the Reference Example 3.

Reference Example 4

Talc, kaolin, alumina, binder, water, and the like were blended and kneaded. The resulting kneaded compound was extruded from an extruder to obtain a honeycomb formed body with a diameter of 120 mm, length of 170 mm, wall thicknesses of about 100 µm, and comprising about 300 cells per square inch (about 46/cm$^2$). This formed body with the side being surrounded by an aluminum foil was vertically placed (so that the cell axis is in the vertical direction) in a batch microwave drying furnace (heating efficiency: 0.5) and dried by irradiating microwaves at a frequency of 2.45 GHz for 900 seconds at an output density of 0.5 kW/kg. In this example, the ratio of the microwave incident density from the vertical direction to the incident density from the horizontal direction of the honeycomb formed body is supposed to be about 1:0. After drying, the residual water content was measured for the perimeter 11 and the core 13 of the honeycomb formed body 1 shown in FIG. 11, each from a height of 110 (bottom) to 170 (top).

Example 1

Figure 16:
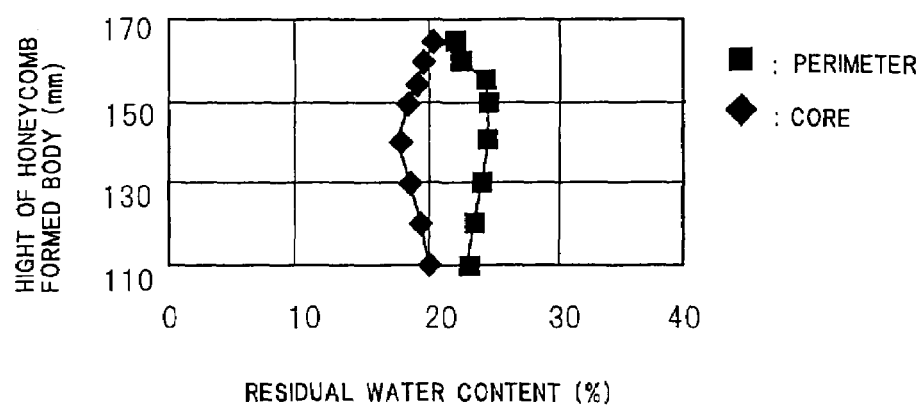
FIG. 16 is a graph showing the results obtained in Example 1.

The formed body prepared in the same manner as in Reference Example 4 was vertically placed (so that the cell axis is in the vertical direction) in a batch microwave drying furnace (heating efficiency: 0.5) and dried by irradiating microwaves at a frequency of 2.45 GHz for 90 seconds at an output density of 5 kW/kg. In this example, the ratio of the microwave incident density from the vertical direction to the incident density from the horizontal direction of the honeycomb formed body is supposed to be about 1:0. After drying, the residual water content was measured in the same manner as in Reference Example 4. The results are shown in FIG. 16.

In both Reference Example 4 and Example 1, an aluminum foil was wound around the side of the honeycomb formed bodies to reflect microwaves from the horizontal direction, so that the incident density from the vertical direction to the honeycomb formed bodies may be larger than the incident density from the horizontal direction. In Reference Example 4 in which the microwave power density was small (0.5 kW/kg), although the difference between the residual water content in the perimeter and the core was small, the water content difference was too large in the vertical direction of the honeycomb formed body to sufficiently inhibit deformation of cells. On the other hand, in the Example in which the microwave power density was large (5 kW/kg), not only the residual water content difference in the perimeter and the core was small, but also the water content difference in the vertical direction of the honeycomb formed body was sufficiently small to dry the entire formed body at an almost uniform rate with almost no cell deformation.

Reference Example 5

Talc, kaolin, alumina, binder, water, and the like were blended and kneaded. The resulting kneaded compound was extruded from an extruder to obtain a honeycomb formed body with a diameter of 120 mm, length of 200 mm, wall thicknesses of about 100 μm, and comprising about 300 cells per square inch (about 46/cm$^2$). This formed body was vertically placed (so that the cell axis is in the vertical direction) in a batch microwave drying furnace (heating efficiency: 0.5) and dried by irradiating microwaves at a frequency of 2.45 GHz for 60 seconds at an output density of 5 kW/kg. In this example, the ratio of the microwave incident density from the vertical direction to the incident density from the horizontal direction of the honeycomb formed body is supposed to be about 1:1. After drying, the residual water content was measured for the perimeter 11 and the core 13 of the honeycomb formed body 1 shown in FIG. 11, each from a height of 0 (bottom) to 200 (top).

Example 2

Figure 18:
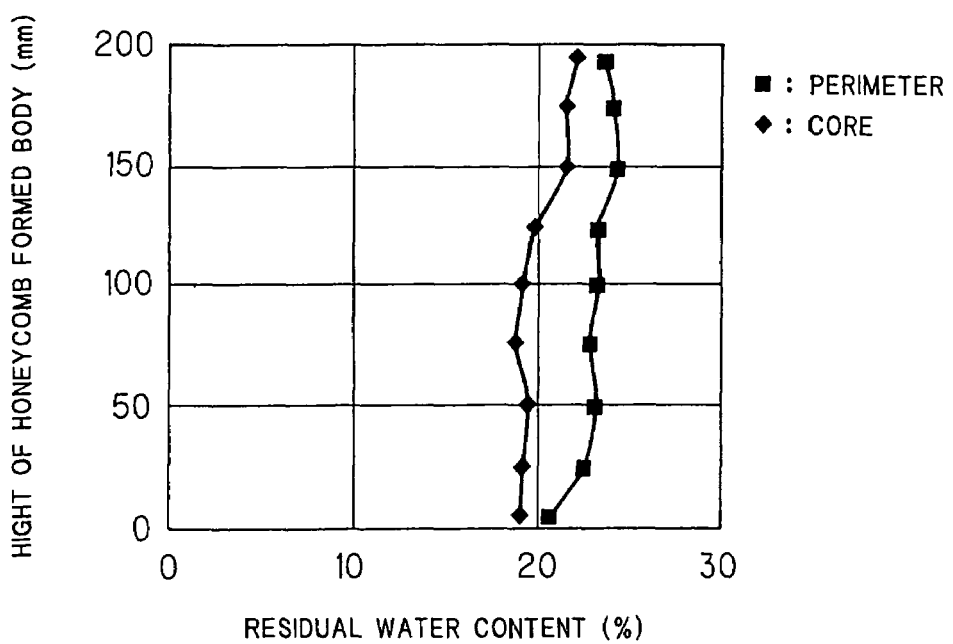
FIG. 18 is a graph showing the results obtained in Example 2.

The honeycomb formed body produced in the same manner as in Reference Example 5 was vertically placed (so that the cell axis is in the vertical direction) in a cylindrical shelter made of metal with an internal diameter of 140 mm and a length of 200 mm. The cylindrical shelter was placed in a batch microwave drying furnace (heating efficiency: 0.5). The distance between the perimeter of the honeycomb formed body and the inner surface of the shelter was 10 mm. The formed body was then dried by irradiating microwaves at a frequency of 2.45 GHz for 60 seconds at an output density of 5 kW. In this example, the incident density A from the vertical direction and the incident density B from the horizontal direction of the honeycomb formed body satisfied the relationship of A/(A+B)>0.7. After drying, the residual water content was measured in the same manner as in Reference Example 5. The results are shown in FIG. 18.

Example 3

Figure 19:
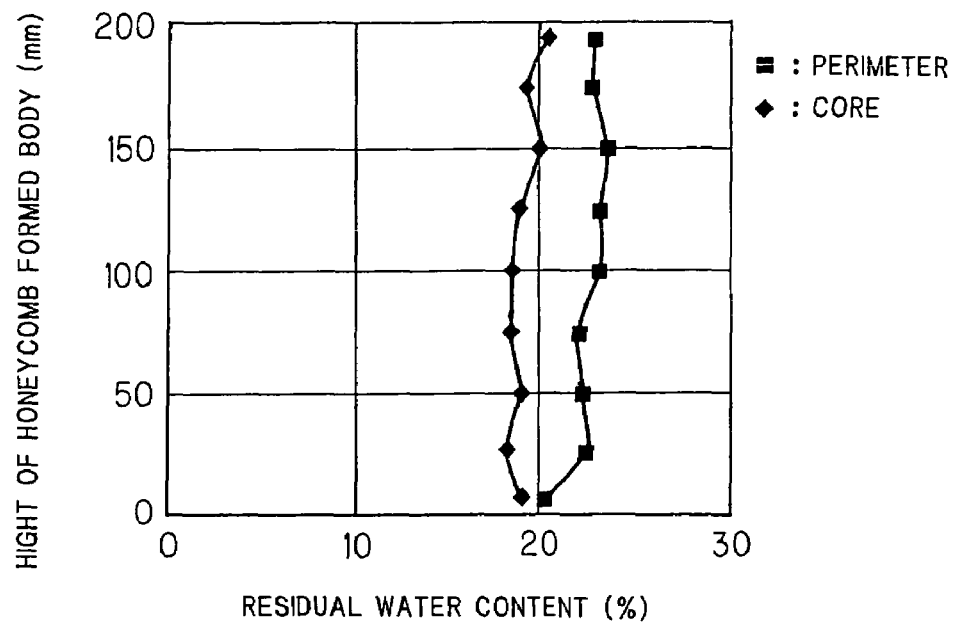
FIG. 19 is a graph showing the results obtained in Example 3.

A honeycomb formed body was dried by microwaves in the same manner as in Example 2, except that the length of the cylindrical metal shelter was 180 mm. After drying, the residual water content was measured in the same manner as in Reference Example 5. The results are shown in FIG. 19.

Reference Example 6

Figure 20:
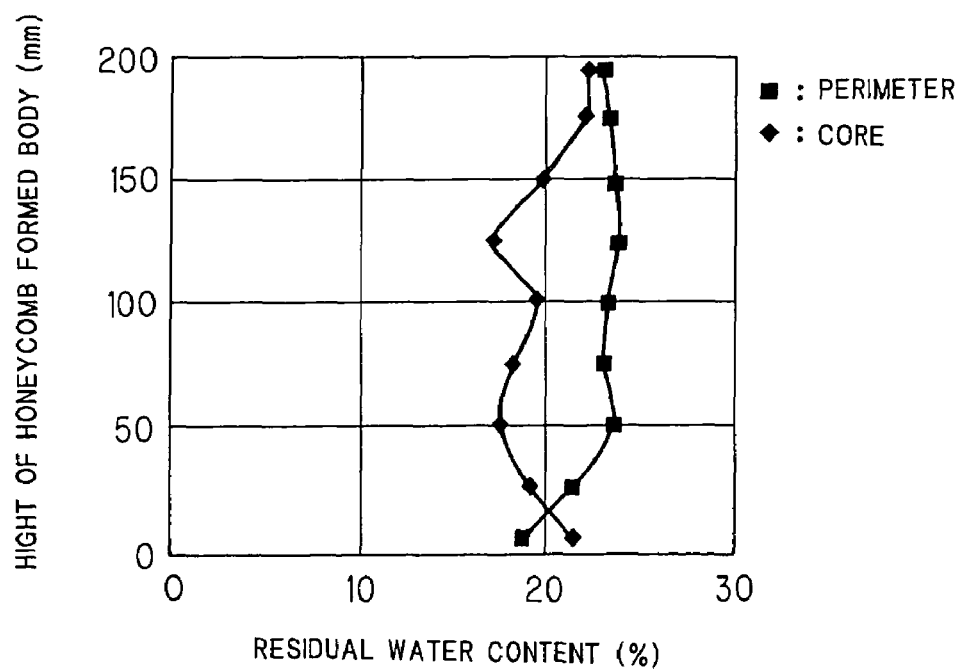
FIG. 20 is a graph showing the results obtained in Reference Example 6.

A honeycomb formed body was dried by microwaves in the same manner as in Example 2, except that the inner diameter of the cylindrical metal shelter was 270 mm and the distance between the perimeter of the honeycomb formed body and the inner surface of the shelter was 75 mm. After drying, the residual water content was measured in the same manner as in Reference Example 2. The results are shown in FIG. 20.

Example 4

Figure 21:
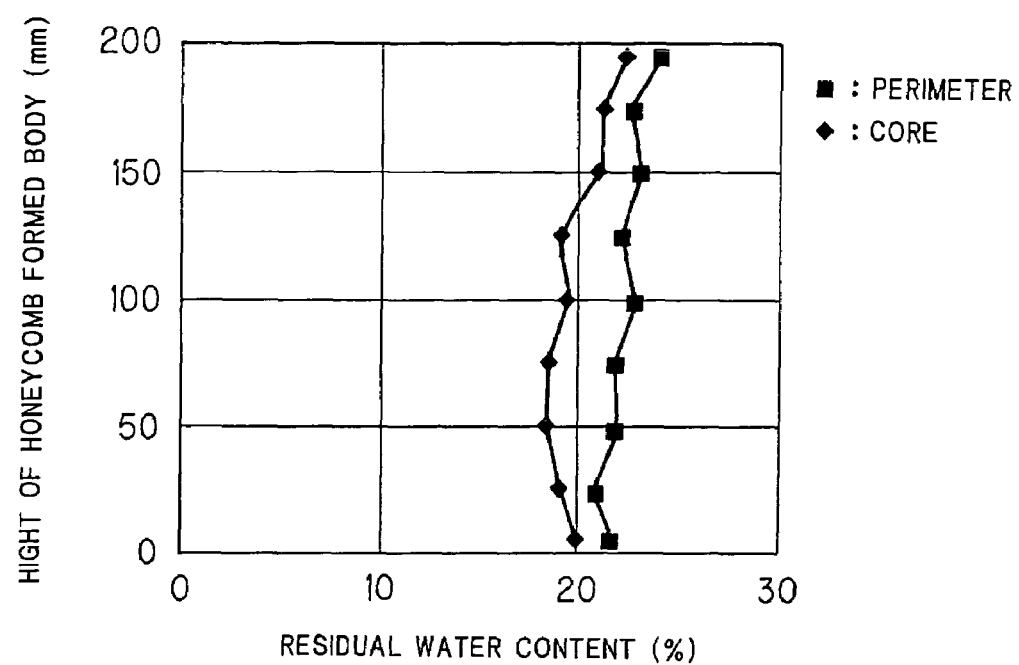
FIG. 21 is a graph showing the results obtained in Example 4.

Three honeycomb formed bodies produced in the same manner as in Reference Example 5 were placed with the cell axis in the vertical direction on a moving path in a continuous microwave drying furnace (heating efficiency: 0.5). The distance between the adjacent honeycomb formed bodies was 20 mm. A pair of metal shelter plates (height: 220 mm, length: 500 mm, thickness: 1 mm) were installed on both sides of the moving path in the manner that the honeycomb formed bodies were placed between them. The distance between the shelter plates and the honeycomb formed bodies was 20 mm. The formed body was then dried by irradiating microwaves at a frequency of 2.45 GHz for 60 seconds at an output density of 5 kW/kg. In this example, the incident density A from the vertical direction and the incident density B from the horizontal direction of the honeycomb formed body satisfied the relationship of A/(A+B)>0.7. After drying, the residual water content was measured in the same manner as in Reference Example 5. The results are shown in FIG. 21.

Figure 17:
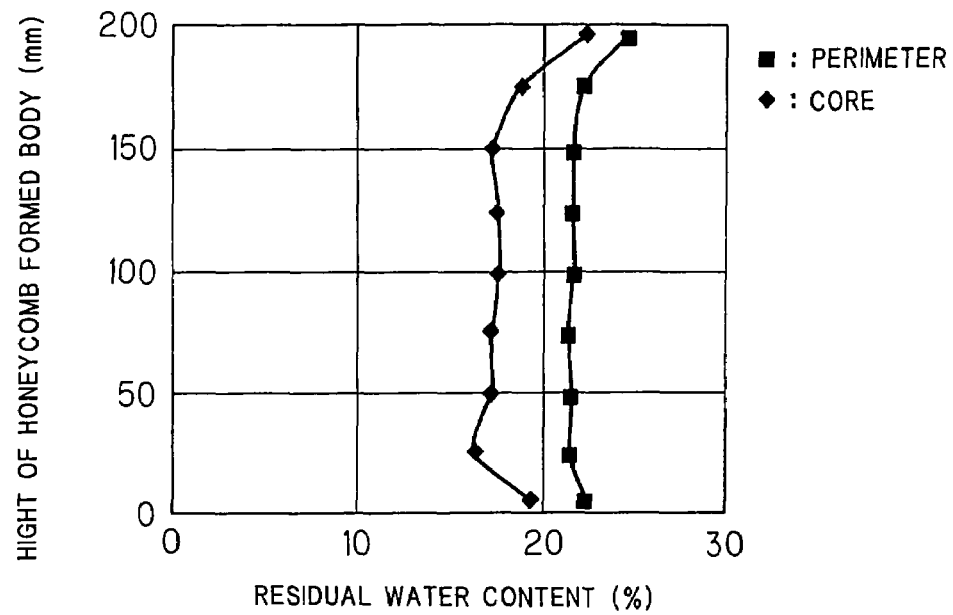
FIG. 17 is a graph showing the results obtained in Reference Example 5.

It can be seen from FIGS. 17 and 18 that in Example 2, in which the microwave incident density from the horizontal direction is restricted by the cylindrical metal shelter plates so that the microwave incident density from the vertical direction of the honeycomb formed body may become larger than the incident density from the horizontal direction, the difference of the residual water content in the vertical direction, as well as the difference of the residual water content in the perimeter and the core, was small, indicating that the difference in the drying speed inside the formed bodies is small. It can be seen from FIGS. 18 and 19 that in Example 3 in which the length of the shelter is shorter than the length of the honeycomb formed body as opposed to Example 2 in which the length of the shelter is the same as the length of the honeycomb formed body, the difference of the residual water content in the perimeter and the core is slightly larger in the upper part of which the honeycomb formed body protrudes from the upper end of the shelter. It can be seen from FIGS. 18 and 20 that the difference in the residual water content in the vertical direction was larger in Reference Example 6, in which the distance between the perimeter of the honeycomb formed body and the inner surface of the shelter was more than ¼ of the microwave wavelength (120 mm), than in Example 2 in which this distance is more than 5 mm but less than ¼ of the microwave wavelength. Furthermore, FIG. 21 indicates that the metal shelters installed on both sides of the moving path in a continuous microwave drying furnace can also effectively restrict the microwave incident density from the horizontal direction, whereby both the water content difference in the vertical direction and the residual water content difference in the perimeter and the core are reduced, ensuring a uniform drying speed in each part of formed body.

The method is suitably applied to drying honeycomb formed bodies used as a catalyst carrier and a diesel particulate filter for exhaust gas purification.

What is claimed is:

1. A method for drying a honeycomb formed body using microwaves comprising:
    placing the honeycomb formed body in a drying furnace with the cell axis in the vertical direction, and
    irradiating the honeycomb formed body with microwaves at a frequency of 300–30,000 MHz, while maintaining the difference of the water content in the vertical direction of the honeycomb formed body at 0.3% per mm or less.

2. The method according to claim 1, wherein the microwave incident density from the vertical direction of the honeycomb formed body is larger than the microwave incident density from the horizontal direction and the microwave output density is controlled to be the threshold value or more of the output density at which the cells of the honeycomb formed body are no longer deformed.

3. The method according to claim 2, wherein the incident density A from the vertical direction and the incident density B from the horizontal direction of the honeycomb formed body satisfy the relationship of $A/(A+B)>0.7$.

4. A method for drying a honeycomb formed body using microwaves comprising:
    placing the honeycomb formed body in a drying furnace with the cell axis in the vertical direction, and
    irradiating the honeycomb formed body with microwaves at a frequency of 300–30,000 MHz,
    wherein the honeycomb formed body is placed inside a cylindrical shelter so that the distance between the outer circumference of the honeycomb formed body and the inner surface of the shelter is in the range from 5 mm to ¼ of the microwave wavelength.

5. The method according to claim 4, wherein the length of the shelter is between the length of the honeycomb formed body plus ½ of the microwave wavelength and the length of the honeycomb formed body minus ½ of the microwave wavelength.

6. A method for drying a honeycomb formed body using microwaves comprising:
    placing the honeycomb formed body in a drying furnace with the cell axis in the vertical direction, causing the honeycomb formed body to move in a predetermined direction, and
    irradiating the honeycomb formed body with microwaves at a frequency of 300–30,000 MHz while moving,
    wherein a pair of shelter plates is installed on both sides of the moving path of the honeycomb formed body in the manner that the honeycomb formed body is placed between them with the distance between the perimeter of the honeycomb formed body and the shelter being in the range from 5 mm to ¼ of the microwave wavelength.

7. A method for drying a honeycomb formed body using microwaves comprising:
    placing the honeycomb formed body in a furnace with the cell axis in the vertical direction, causing the honeycomb formed body to move in a predetermined direction, and
    irradiating the honeycomb formed body with microwaves at a frequency of 300–30,000 MHz while moving,
    wherein a forwarding pallet is provided to place a plurality of honeycomb formed bodies in the direction orthogonal to the forwarding direction, installing said shelter plates on the forwarding pallet with the distance between the honeycomb formed body and the shelter being in the range from 5 mm to ¼ of the microwave wavelength.

* * * * *